United States Patent
Schabowski

(10) Patent No.: US 7,970,568 B1
(45) Date of Patent: Jun. 28, 2011

(54) PEDOMETER METHOD AND APPARATUS

(76) Inventor: John V. Schabowski, Ithaca, NY (US)

( * ) Notice: Subject to any disclaimer, the term of this patent is extended or adjusted under 35 U.S.C. 154(b) by 57 days.

(21) Appl. No.: 11/397,277

(22) Filed: Apr. 4, 2006

Related U.S. Application Data

(60) Provisional application No. 60/668,387, filed on Apr. 5, 2005.

(51) Int. Cl.
*G06F 19/00* (2006.01)
(52) U.S. Cl. .................................................. 702/116
(58) Field of Classification Search ............. 702/116
See application file for complete search history.

(56) References Cited

U.S. PATENT DOCUMENTS

| | | | |
|---|---|---|---|
| 4,053,755 A | 10/1977 | Sherrill | |
| 4,144,568 A | 3/1979 | Hiller | |
| 4,175,446 A | 11/1979 | Crowninshield | |
| 4,220,996 A | 9/1980 | Searcy | |
| 4,223,211 A | 9/1980 | Allsen | |
| 4,309,599 A | 1/1982 | Myers | |
| 4,371,945 A | 2/1983 | Karr | |
| 4,387,437 A | 6/1983 | Lowrey | |
| 4,703,445 A * | 10/1987 | Dassler | 702/160 |
| 4,855,942 A | 8/1989 | Bianco | |
| 4,962,469 A * | 10/1990 | Ono et al. | 702/160 |
| 5,033,013 A | 7/1991 | Kato | |
| 5,065,414 A | 11/1991 | Endou | |
| 5,117,444 A | 5/1992 | Sutton | |
| 5,485,402 A | 1/1996 | Smith | |
| 5,530,930 A | 6/1996 | Hahn | |
| 5,596,821 A * | 1/1997 | Solo | 36/136 |
| 5,684,284 A | 11/1997 | Lee | |
| 6,175,608 B1 | 1/2001 | Pyles | |
| 6,298,314 B1 | 10/2001 | Blackadar | |
| 6,898,550 B1 * | 5/2005 | Blackadar et al. | 702/182 |
| 2002/0089425 A1 * | 7/2002 | Kubo et al. | 340/573.1 |
| 2004/0112151 A1 * | 6/2004 | Maxwell et al. | 73/865.4 |
| 2005/0075213 A1 * | 4/2005 | Arick | 482/1 |
| 2006/0010699 A1 * | 1/2006 | Tamura | 33/355 R |

OTHER PUBLICATIONS

Cliff Randell, Personal Position Measurement Using Dead Reckoning, IEEE 2003, section 1-9.*
Good, Keith, "Exciting Electrics", 1999, ISBN 0-237-51985-2, p. 26.*
"Pedometers: Walking by the numbers," Consumer Reports, Oct., 2004, pp. 30-31, vol. 69, No. 10.
Inman, V.T., Ralston, H.J., Kinematics, Human Walking, 1981, p. 22 & p. 28, Williams and Wilkins, Baltimore, MA.
Daniels, J.T., Daniels' Running Formula, 1998, p. 93, Human Kinetics, Champaign, IL.

* cited by examiner

*Primary Examiner* — Tung S Lau

(57) ABSTRACT

A method for detecting steps taken by a person in locomotion on foot having a step-detection apparatus carried on the person. The step-detection apparatus generates a signal in response to locomotion of the person. The signal is compared to the timing characteristics of human gait to identify steps taken. The step-detection apparatus can be carried in a front pants pocket of the person.

2 Claims, 3 Drawing Sheets

PEDOMETER METHOD AND APPARATUS

CROSS-REFERENCE TO RELATED APPLICATIONS

This application claims the benefit of provisional patent application Ser. No. 60/668,387, filed 2005 Apr. 5 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to pedometers, specifically to an improved method for detecting strides for a pedometer.

2. Prior Art

In many recreational endeavors and occupations a need exists for persons to be able to measure distances by walking from one point to another. For example, exercise walkers often record their daily mileage in a diary. Golfers and hunters often want to know the distance between two landmarks. Real estate agents often need to know the length and width of a building or field.

Prior art pedometers do not support these distance-measuring needs with an acceptable level of accuracy. *Consumer Reports* magazine (pp. 30-31, October, 2004) recently tested a number of pedometers and found that most were inaccurate by 5 to 10 percent, and some were inaccurate by 20 percent or more. "The worst were so inaccurate that if you walked five miles, they might say you'd covered three to seven." This is not satisfactory for an exerciser wanting to know the number of miles traveled to within a fraction of a mile, let alone a golfer or real estate agent wanting to know a distance to within a few yards or feet.

Pedometers calculate distance by multiplying the length of the user's step (or stride) times the number of steps (or strides) the user takes. A stride is one step by each leg, or two steps total. Any given pedometer is designed to count either steps or strides.

The accuracy of the distance measured by a pedometer is a function of: (1) the accuracy of the step/stride length entered into the pedometer for a given person, and (2) the accuracy with which that pedometer counts steps/strides. Researchers of human gait have determined that a person's step/stride length is the same from one step/stride to the next and from one day to the next when that person walks at their self-selected speed (Inman et al, *Human Walking*, p. 22, 1981). Self-selected walking speed, also called free- or natural-walking speed, is the speed that a walker unconsciously uses when walking without any particular purpose. Accurately determining a person's step/stride length for their self-selected walking speed is a straightforward exercise of counting the number of steps/strides taken for a measured distance and then dividing the distance by the number of steps/strides. So the distance-measuring accuracy of any given electronic pedometer is determined by the accuracy of the step/stride detection mechanism for that pedometer, assuming an accurate step/stride length is used.

The prior art uses a number of different mechanisms to detect steps and strides. U.S. Pat. No. 4,053,755 to Sherrill (1977) is an example of a mechanism for sensing the up-and-down motion of the torso. It uses an electrically conductive leaf spring with a small weight on its free end for momentary engagement with a mating electrically conductive contact. This switch is normally open, and each step taken by the user causes the weight to be jarred downward to bring the contacts together and close the switch. U.S. Pat. No. 4,144,568 to Hiller et al (1979) improves this by replacing the ordinary on/off switch with a magnetic reed switch. U.S. Pat. No. 5,117,444 to Sutton et al (1992) teaches "Ordinary switches, however, are prone to intermittent operation" and "Reed switch pedometers are much more reliable and give fewer false readings than other prior art devices."

Other mechanisms are used to detect steps and strides. U.S. Pat. No. 4,175,446 to Crowninshield (1979) uses a strain gauge to sense foot strike with the ground and detect strides. U.S. Pat. No. 4,371,945 to Karr et al (1983) uses an ultrasonic generator and detector to sense (lower) leg swing and detect steps. U.S. Pat. No. 4,855,942 to Bianco (1989) uses a mercury switch to sense arm swing and detect strides. U.S. Pat. No. 5,485,402 to Smith et al (1996) uses an accelerometer to sense lower-leg swing and detect strides. The prior art teaches away from using an inexpensive, ordinary tilt switch as a sensor for a pedometer.

All of the prior art has the step- or stride-detection mechanism attached to a body part or an item of clothing of the user. Some of the prior art asserts that body motions other than that specifically described can detect steps with a certain detection mechanism. For instance, U.S. Pat. No. 4,223,211 to Allsen et al (1980) states, "The said motions accompanying foot motions of the subject may be motions of any part of the body." This patent, like others making similar statements, does not describe how the other body motions actually detect steps taken. No prior art detects strides by sensing the motion of a user's upper leg with a stride-detection mechanism in the front pants pocket of the user that is unattached to either the pocket or the user.

Prior art pedometers assume that each pulse in the electrical signal produced by the sensor corresponds to a single step or stride. U.S. Pat. No. 4,387,437 to Lowery et al (1983) recognizes the problem of switch bounce giving false step indications and incorporates a debounce circuit to attempt to eliminate false indications. U.S. Pat. No. 5,684,284 to Lee et al (1997) uses an electronic filter to prevent "extraneous mechanical vibration of the unit from registering as a player's stride." No prior art uses the timing of human gait to interpret step/stride-sensor signals and differentiate step/stride indications from switch bounce and non-step/stride motion artifacts.

OBJECTS AND ADVANTAGES

Accordingly, several objects and advantages of the present invention are:

(a) to provide an accurate stride-detection mechanism for a pedometer;

(b) to provide a method to differentiate stride indications from switch bounce and non-stride motion artifacts in the signal generated by the stride sensor in a pedometer;

(c) to provide a convenient-to-use front pants-pocket format for pedometers;

(d) to provide for using an inexpensive, ordinary tilt switch as a stride sensor for a pedometer.

Further objects and advantages will become apparent from a consideration of the ensuing description and drawings.

SUMMARY

In accordance with the present invention a pedometer comprises an electronic system with a tilt switch used as a stride sensor housed in an enclosure dimensioned to fit in a front pants pocket of a user. The user's walking causes the stride sensor electrical contacts to open and close with the forward then backward motion of the user's leg. The electronic system uses the timing of human gait to interpret tilt switch stride sensor signals and differentiate stride indications from switch bounce and non-stride motion artifacts.

DRAWINGS

Figures

Figure 3A:
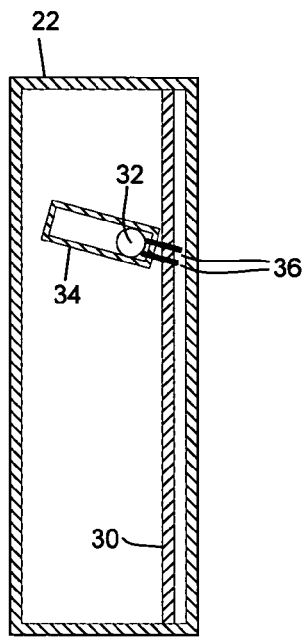
Figure 3B:
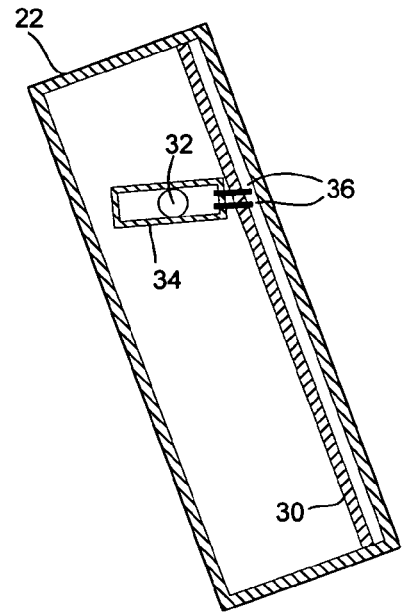

FIGS. 3*a*-3*b* are lateral cross-sectional views of the present pedometer invention.

Figure 4:
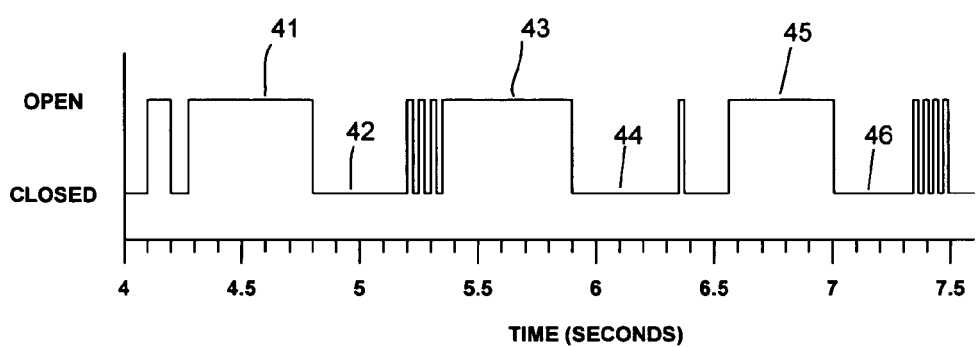

FIG. 4 is a waveform illustrating the opening and closing of the tilt-switch stride sensor in the present pedometer invention.

Figure 5:
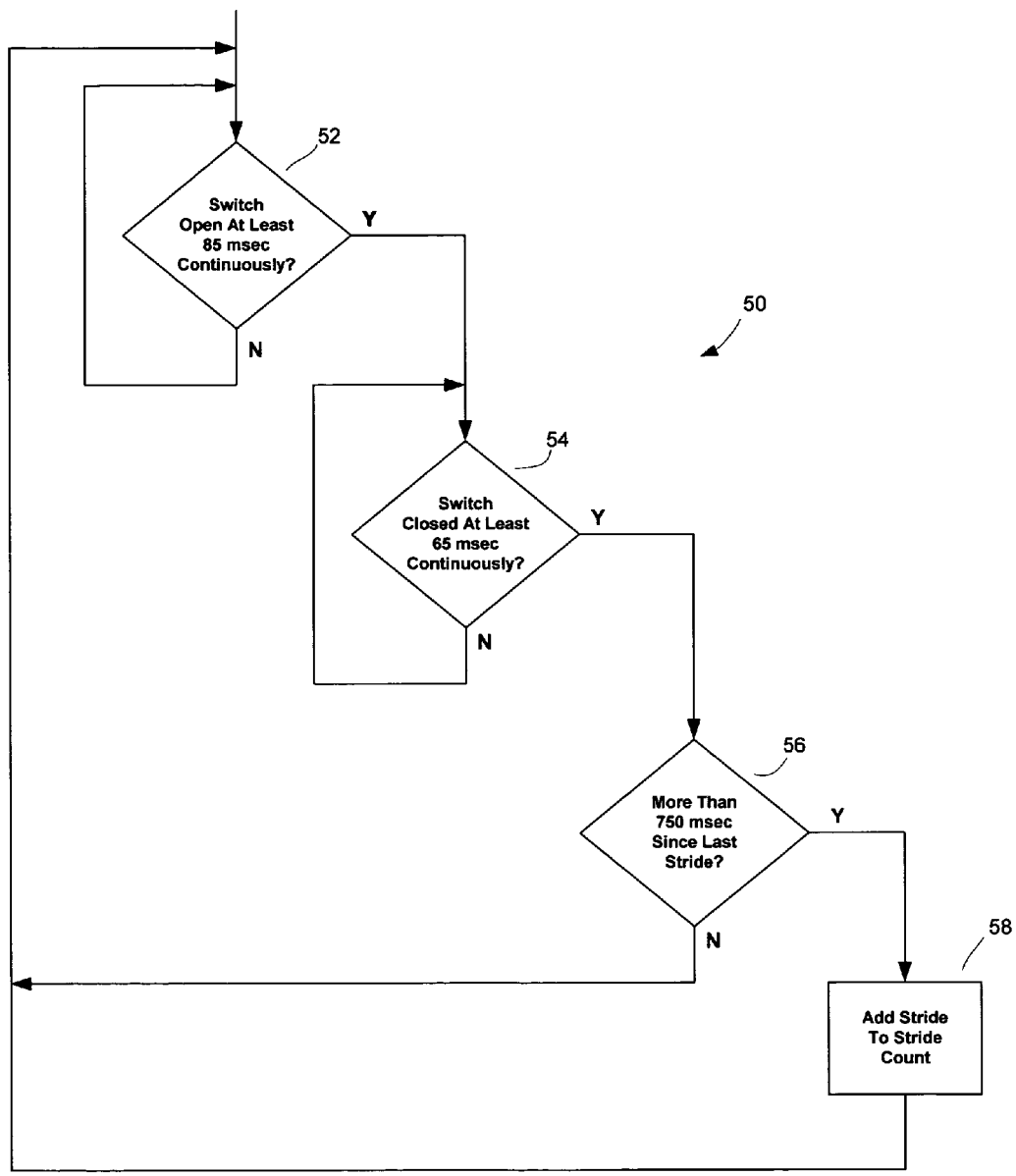

FIG. 5 is a flow chart of a method to interpret the signal generated by the sensor in the present pedometer invention.

REFERENCE NUMERALS

| | |
|---|---|
| 10 | microcomputer |
| 12 | pushbutton switches |
| 14 | LCD display |
| 16 | tilt-switch stride sensor |
| 18 | battery |
| 20 | user |
| 22 | enclosure |
| 24 | front pants pocket |
| 30 | circuit board |
| 32 | electrically-conductive ball |
| 34 | enclosed, non-conducting tube |
| 36 | electrical contacts |
| 41 | first long-open period |
| 42 | first long-closed period |
| 43 | second long-open period |
| 44 | second long-closed period |
| 45 | third long-open period |
| 46 | third long-closed period |
| 50 | routine |
| 52 | first step of routine |
| 54 | second step of routine |
| 56 | third step of routine |
| 58 | fourth step of routine |

DETAILED DESCRIPTION

Figure 1:
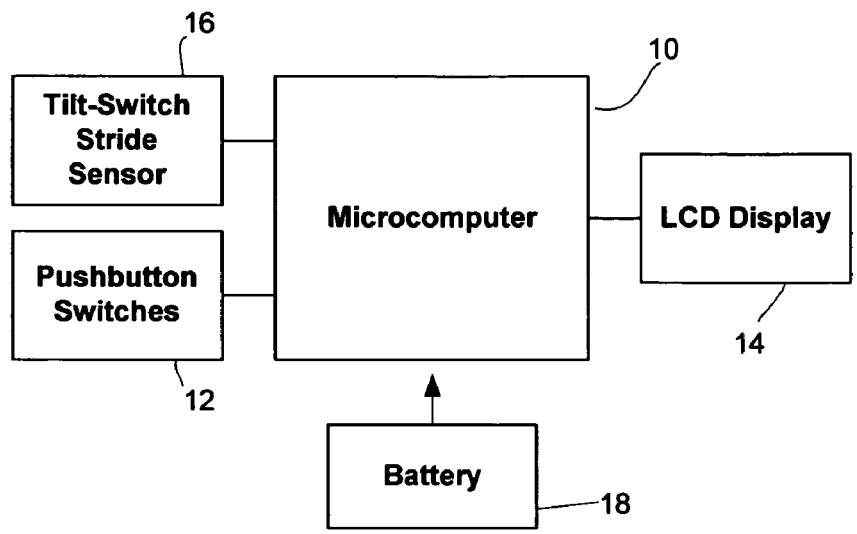
FIG. 1 is a block diagram of the electronic system of the present pedometer invention.
Figure 2:
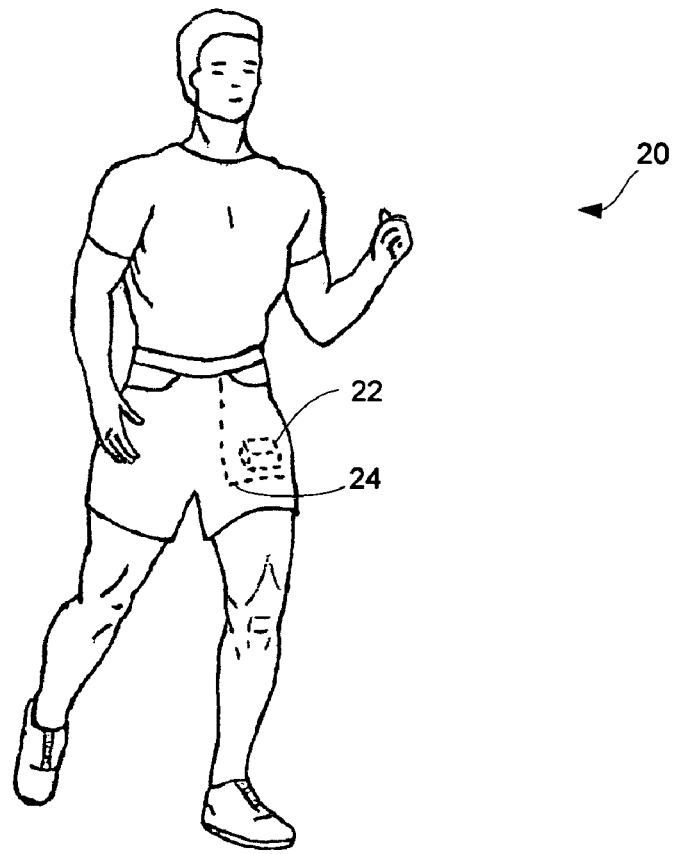
FIG. 2 is a perspective view showing the present pedometer invention in the front pants pocket of a user.

FIGS. 1-3—Preferred Embodiment

FIG. 1 is a block diagram of an electronic system for the present pedometer invention. A microcomputer 10 consists of a CPU, RAM, input/output, and a ROM containing a control program to implement pedometer and other functions. A plurality of pushbutton switches 12 supply input to microcomputer 10 to enter data such as stride length, to enter commands such as start or stop pedometer distance measurement or stride counting, and to enter information for other functions microcomputer 10 may perform. A LCD display 14 displays distance walked, strides taken, stride length, or information from other functions microcomputer 10 may perform. A tilt-switch stride sensor 16 detects strides and supplies a signal to microcomputer 10. A battery 18 provides power to the system.

FIG. 2 is a perspective view showing the present pedometer invention, contained in an enclosure 22, in a front pants pocket 24 of a user 20. Enclosure 22 is not attached to pocket 24 and is free to move around within pocket 24. Enclosure 22 is rectangular shaped and dimensioned to fit in front pants pocket 24 and not rotate or flip in any direction to change its orientation in the pocket. A range of dimensions will satisfy these requirements. Enclosure 22 has distinctive markings such that a user knows the correct orientation with which to place it in pocket 24.

FIGS. 3*a*-3*b* are lateral cross-sectional views of the present pedometer invention. Enclosure 22 contains a circuit board 30 to which sensor 16, and other electronic components, are mounted. Sensor 16 consists of an electrically-conductive ball 32 in an enclosed, non-conducting tube 34 with electrical contacts 36 at one end. Sensor 16 is oriented slightly less than perpendicular to circuit board 30. The angle is such that, when enclosure 22 is in pocket 24 of user 20 and user 20 is standing still, enclosure 22 is vertical as shown in FIG. 3*a* and gravity forces ball 32 into contact with contacts 36, closing the switch. In FIG. 3*b*, user 20 has moved the leg forward to begin a stride, and enclosure 22 has tilted away from vertical and ball 32 has moved away from contacts 36, opening the switch. When user 20 completes the stride enclosure 22 returns to the position shown in FIG. 3*a* where gravity has returned ball 32 into contact with contacts 36.

Operation—FIGS. 4, 5

Forward and backward leg motion of user 20 is not the only cause of the opening and closing of sensor 16. Sensor 16 is an ordinary switch that exhibits switch bounce. Non-stride motion artifacts can produce opening and closing of sensor 16 as a result of enclosure 22 moving around within pocket 24. Loose-fitting pants such as walk shorts produce more non-stride motion artifacts than tight-fitting pants such as jeans.

Human gait has timing properties that can be used to interpret the opening and closing sequences of sensor 16. Research has found that walking step rates are within the range of 75 to 140 steps per minute for adult men, and 80 to 150 steps per minute for adult women, with the typical being about 110 steps per minute (Inman et al, *Human Walking*, p. 28, 1981). Elite distance runners run at approximately 180 steps per minute (Daniels, *Daniels' Running Formula*, p. 93, 1998). It is reasonable to expect that humans will not walk faster than the 90 strides per minute rate of world-class runners, so walking strides will not occur faster than once every 750 milliseconds. It is also reasonable to expect that with a stride taking at least 750 milliseconds, the forward movement of the leg will produce some minimum open period for sensor 16, followed by some minimum closed period for the backward movement of the leg. Shorter opens and closes can then be attributed to either switch bounce or non-stride motion artifacts.

FIG. 4 is a waveform illustrating the opening and closing of sensor 16 as user 20 walks three strides. A first long-open period 41 followed by a first long-closed period 42 comprises the first stride. A second long-open period 43 followed by a second long-closed period 44 comprises the second stride. A third long-open period 45 followed by a third long-closed period 46 comprises the third stride. The shorter open and closed periods in the waveform are the result of switch bounce and non-stride motion artifacts.

FIG. 5 is a flow chart of a routine 50 that interprets the signal generated by sensor 16 in the present pedometer invention and differentiates stride indications from switch bounce and non-stride motion artifacts. This routine is implemented as a portion of the control program executed by microcomputer 10. Routine 50 begins at a step 52, where routine 50 waits until sensor 16 is open for at least 85 milliseconds continuously. After this condition is met, routine 50 proceeds to a step 54, where routine 50 waits until sensor 16 is closed for at least 65 milliseconds continuously. After this condition is met, routine 50 proceeds to a step 56, where the time elapsed since the last stride is compared to 750 milliseconds. If the time elapsed is more than 750 milliseconds, routine 50 proceeds to a step 58 where a stride is added to the current stride count, and then routine 50 returns to step 52. If the time elapsed is less than 750 milliseconds, the potential stride indication is ignored and routine 50 returns to step 52.

The times of 85 and 65 milliseconds in steps 52 and 54 respectively of routine 50 were selected after numerous observations of sensor 16 for a number of different users, wearing a number of different tight- and loose-fitting pants, walking at a number of various high and low speeds. The times were chosen such that they were longer than observed switch bounce and non-stride artifacts under the worst-case conditions of fast walking and loose-fitting pants.

CONCLUSIONS, RAMIFICATIONS, AND SCOPE

Accordingly the reader will see that this invention provides an accurate stride-detection mechanism for a pedometer, a method to differentiate stride indications from switch bounce and non-stride motion artifacts in the signal generated by the stride sensor in a pedometer, a convenient-to-use front pants-pocket format for pedometers, and the ability to use an inexpensive, ordinary tilt switch as a stride sensor for a pedometer.

While the above description contains many specificities, these should not be construed as limiting the scope of the invention but as merely providing illustrations of the presently preferred embodiment of the invention. Many other ramifications and variations are possible within the teachings of the invention. For example, (a) the enclosure can have other shapes, such as oval, oblong, or any other shape, including those that may aide in correct orientation of the enclosure in the user's pocket;

(b) any other type of controller, either programmable or hard-wired, can be used instead of a microcomputer;

(c) any other type of sensor, such as a mercury switch, reed switch, or an accelerometer, can be used to sense the forward and backward motion of a user's upper leg;

(d) the method to differentiate strides from switch bounce and non-stride motion artifacts can be used with any other type of step/stride-detection mechanism for a pedometer, including those that detect up-and-down motion of the torso, foot strike, arm swing and lower leg swing;

(e) the minimum stride duration of 750 milliseconds is not a precise limit, and can vary by 50 or more milliseconds;

(f) the open and closed times of 85 and 65 milliseconds respectively are not precise, and other times will work for the present pedometer invention. The times can also vary with different types of tilt switches, different angles between tilt switch and the circuit board, and different sized and shaped enclosures from those used in the present pedometer invention.

Thus the scope of the invention should be determined by the appended claims and their legal equivalents, and not by the examples given.

I claim:

1. A method for detecting steps taken by a person in locomotion on foot, comprising the steps of:
    (a) carrying a step-detection apparatus on said person,
    (a1) said step-detection apparatus includes a step sensor and electronic controller,
    (b) said step sensor generating a signal in response to locomotion of said person,
    (c) said electronic controller measuring the time duration of, and the time duration between, features in said signal,
    (c1) said electronic controller includes values of time durations of features, and time durations between features, that have been empirically determined to indicate a step has been taken in said signal from said step sensor,
    (d) said electronic controller comparing said measured time durations to said empirically-determined values of time durations to identify step indications in said signal.

2. A step-detection apparatus using the step-detection method of claim 1, comprising:
    (a) said step detection apparatus is contained in a pocket-sized enclosure carried in an ordinary front, lower-torso clothing pocket of a user,
    (b) said enclosure is free to move within said pocket.

* * * * *